United States Patent [19]
Persson

[11] Patent Number: 6,085,524
[45] Date of Patent: Jul. 11, 2000

[54] DEVICE FOR REGULATING THE ENGINE BRAKING POWER OF AN INTERNAL COMBUSTION ENGINE

[75] Inventor: Per Persson, Partille, Sweden

[73] Assignee: AB Volvo, Gothenburg, Sweden

[21] Appl. No.: 09/091,164

[22] PCT Filed: Dec. 19, 1996

[86] PCT No.: PCT/SE96/01712

§ 371 Date: Jun. 9, 1998

§ 102(e) Date: Jun. 9, 1998

[87] PCT Pub. No.: WO97/22789

PCT Pub. Date: Jun. 26, 1997

[30] Foreign Application Priority Data

Dec. 19, 1995 [SE] Sweden .................................. 9504542

[51] Int. Cl.[7] .................................................... F02D 23/00
[52] U.S. Cl. ............................................. 60/602; 123/323
[58] Field of Search ....................... 60/600, 602; 123/323

[56] References Cited

U.S. PATENT DOCUMENTS 4,474,006 10/1984 Price et al. .

FOREIGN PATENT DOCUMENTS

| 0 467 423 | 1/1992 | European Pat. Off. . |
| 0 474 007 | 3/1992 | European Pat. Off. . |
| 0 477 579 | 4/1992 | European Pat. Off. . |
| 1 179 765 | 10/1964 | Germany . |
| WO 95/26466 | 10/1995 | WIPO . |

*Primary Examiner*—Noah P. Kamen

[57] ABSTRACT

Device for controlling the engine braking power of an internal combustion engine (1) in a motor vehicle, which is equipped with a compression braking device arranged in brake mode to open the exhaust valves at the end of the induction stroke, at the end of the compression stroke or only at the latter, and an exhaust-driven turbocompressor unit (3) with a turbine portion (30), which has variable geometry to vary the degree of charge of the compressor (8). Restrictor valve elements (42) are arranged in the exhaust conduit (41) upstream of the turbine portion (30).

13 Claims, 7 Drawing Sheets

DEVICE FOR REGULATING THE ENGINE BRAKING POWER OF AN INTERNAL COMBUSTION ENGINE

CROSS REFERENCE TO RELATED APPLICATION

This is the 35 USC §371 National Stage of International application PCT/SE96/01712filed on Dec. 19, 1996, which designated the United States of America.

FIELD OF THE INVENTION

The present invention relates to a device for controlling the engine braking effect in an internal combustion engine in a motor vehicle, which is equipped with a compression braking device, means for varying the degree or charge in brake mode, comprising, firstly, an exhaust-driven turbocompressor unit with a turbine portion and a compressor portion, and secondly, valve means disposed in engine exhaust conduit, and means actuatable by the driver of the vehicle for activating the compression braking device and the means for varying the degree charge.

BACKGROUND OF THE INVENTION

It is known that the engine braking power of a vehicle can be increased with the aid of a device or the above described type, by means of which the engine combustion chambers in brake mode during the latter portion of the compression stroke is connected to the exhaust system, for example by opening the regular exhaust valve. The result will be that the air compressed during the compression stroke flows out of the cylinders and that the compression work carried out during the compression stroke will not be recovered during the expansion stroke, and this will result in an increase in the engine braking power. An additional increase in the braking power can be achieved in this case in a known manner by connecting the exhaust system to the cylinders during the latter portion of the induction stroke, so that gas from the exhaust system can flow into the cylinders. This results in an increase in pressure in the cylinder and an inner charging so that the compression work after breaking off the communication between the cylinders and the exhaust system will be increased.

In a device known by SE-A-9401059 of the type described by way of introduction, said valve means are formed of an exhaust pressure regulator (EP regulator), i.e. a damper in the exhaust line downstream of the turbine portion of the turbocompressor unit. By varying the degree of opening of the damper, the driver can control the degree of inner charging and thus increase or reduce the braking power. The damper is controlled by a control unit into which the driver feeds a desired value of the vehicle retardation and into which engine data is fed via sensors such as the degree vehicle retardation and into which engine data is fed via sensors such as the degree of charge and the rpm, and vehicle data such as vehicle speed, accelerator position and clutch pedal position.

SUMMARY OF THE INVENTION

The purpose of the present invention is in general to achieve a device of the type described by way of introduction which makes it possible to achieve higher braking power in the engine than what could be achieved with the described device. The particular purpose is to achieve a device in which the turbocompressor unit can be utilized in a better manner together with the valve means in the exhaust line to vary the braking power of the engine.

This is achieved according to the invention by virtue of the fact that the valve means are restrictor valve means arranged in the engine exhaust conduit upstream of the turbine portion of the turbocompressor unit.

By placing the valve means closer to the exhaust outlet from the cylinders, there is a reduction in the volume of the exhaust conduit between the exhaust valves and the valve means in the exhaust conduit, which means that the pistons will not need to exhaust as much gas as previously in order to create a certain counter-pressure. High counter-pressure can therefore be obtained more rapidly.

In a turbocharged engine with an exhaust pressure regulator downstream of the turbine, the pressure drop required over the turbine, so that the turbine will be able to drive the compressor, cannot be obtained in brake mode. By instead placing the restrictor valve means prior to the turbine portion and adapting the restriction area to the turbine area, the turbocompressor unit can provide supercharging even in brake mode. It is true that the pistons are imparted energy from the gas during the induction stroke, but the work which the pistons must carry out against the gas during the compression stroke will be so much greater that the net effect will be a higher braking power. Another advantage of circulating large volumes of gas through the engine in brake mode is that a greater amount of heat will be removed through the gas than in installations with exhaust pressure regulators in which the heat is primarily diverted by cooling water.

The turbine portion in a turbocompressor unit which is dimensioned to operate in drive mode within the normal rpm range of the engine, will be too large to be able to supercharge in brake mode. The device according to the invention is therefore regularly suited to be used in turbocharged engines with turbines which have variable geometry, or in so-called turbocompound engines which have a turbocompressor unit with a first turbine stage, which drives the compressor portion, and a second turbine stage, which is coupled, via a transmission, to the engine crankshaft. In such turbo units, the first turbine stage is a small high-pressure turbine, while the second turbine stage is a larger low-pressure turbine. It has been found that the corrected mass flow to the compressor turbine in brake mode is approximately equal to that for turbocompound engine mode. In a conventional turbocharged engine, the compressor turbine is substantially larger, which means that the corrected massflows in brake mode and drive mode will approximately equal first at engine rpm above the normal operating rpm.

BRIEF DESCRIPTION OF THE DRAWINGS

The invention will be described in more detail below with reference to examples shown in the accompanying drawings, where.

DETAILED DESCRIPTION OF THE INVENTION

Figure 1:
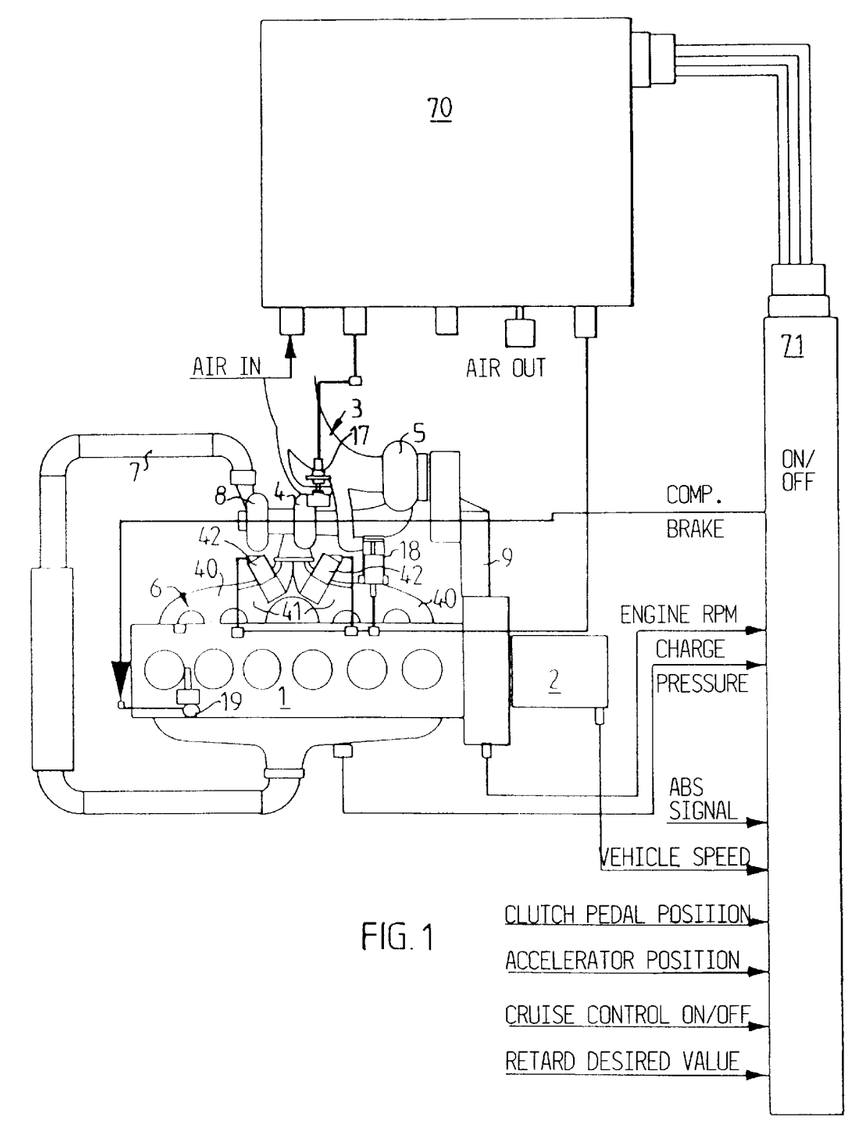
FIG. 1 shows schematically a turbocompound engine with a device according to the invention, FIG. 2 a simplified schematic representation of the engine in FIG. 1.

In FIG. 1, 1 designates a six cylinder engine with a gearbox 2 attached thereto.

A turbocompressor unit, generally designated 3, has a first turbine stage 4 and a second turbine stage 5 connected to the engine exhaust manifold 6. The first turbine stage 4 is a small high-pressure stage, which drives a compressor 8 connected to the engine intake conduit 7, while the second turbine stage 5 is a larger low-pressure stage which is coupled via a transmission 9 to the engine crankshaft 10. The transmission 9 comprises a gear 11 on the output shaft 12 of the turbine stage 5, said shaft 12 driving, via a pair of gears 13, 14 on an intermediate shaft 15, a gear 16 on the crankshaft 10 (see FIG. 2). Via a first continuously adjustable waste-gate valve 17, a larger or smaller amount of exhaust can be shunted past the high-pressure turbine 4 in order to vary the degree of charge. Via a second shunt valve 18, the exhaust can be shunned past the low-pressure turbine 5. The engine 1 has a schematically indicated compression braking device 19, which can be of the type which is shown and described in SE-466 320, and by means of which the engine cylinders during the latter portion of induction stroke, as well as during the latter portion of the compression stroke, can be connected to the engine exhaust manifold to increase the engine braking power. For a more detailed description of the construction and function of a possible embodiment of the compression braking device 19, reference is made to SE-466 320.

Figure 2:
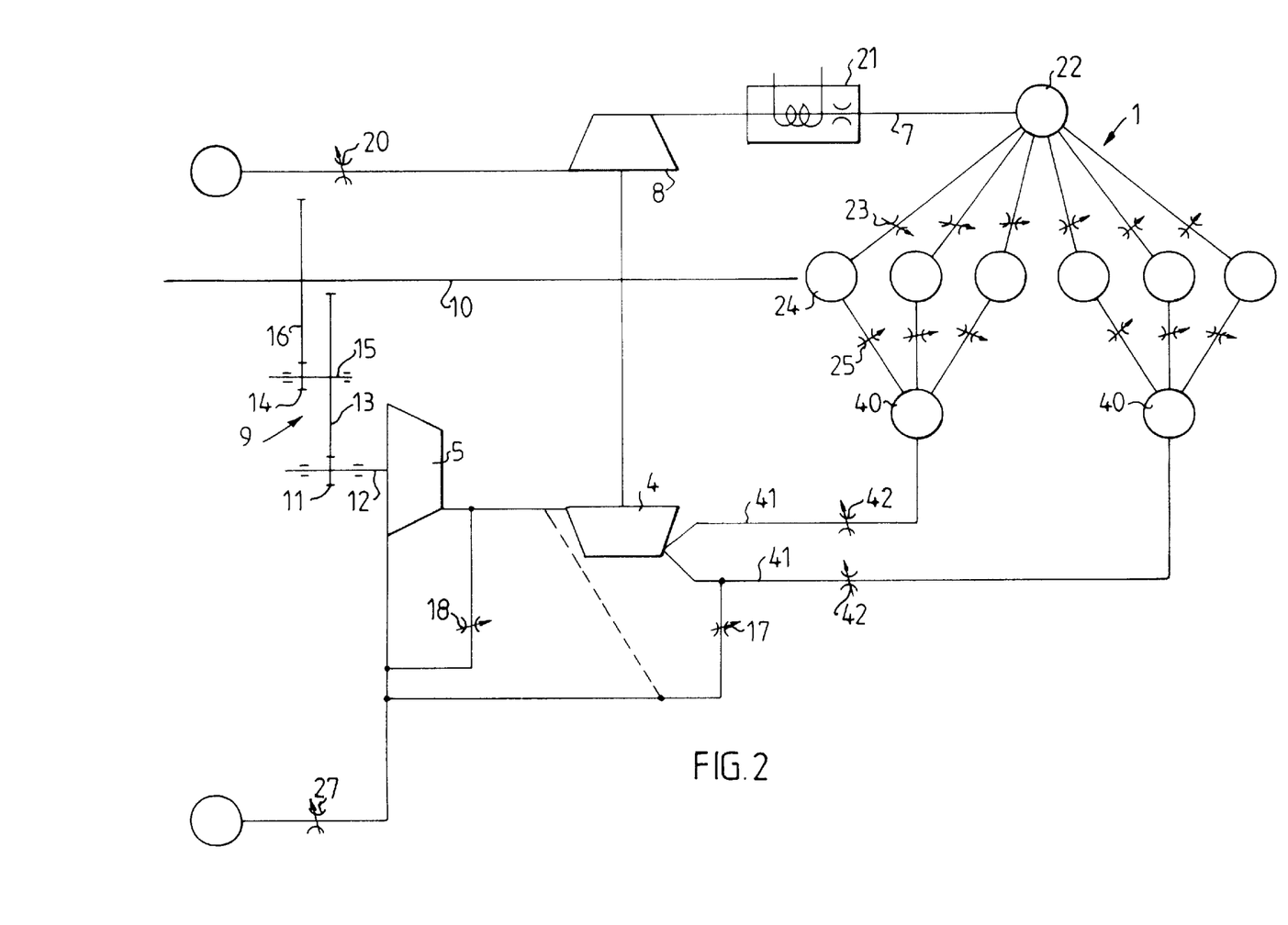

FIG. 2 shows schematically a few details which are not apparent from FIG. 1, namely: an air filter 20, a charged air cooler 21, an intake manifold 22, intake valves 23, cylinders 24, exhaust valves 25, and a muffler 27.

Figure 3:
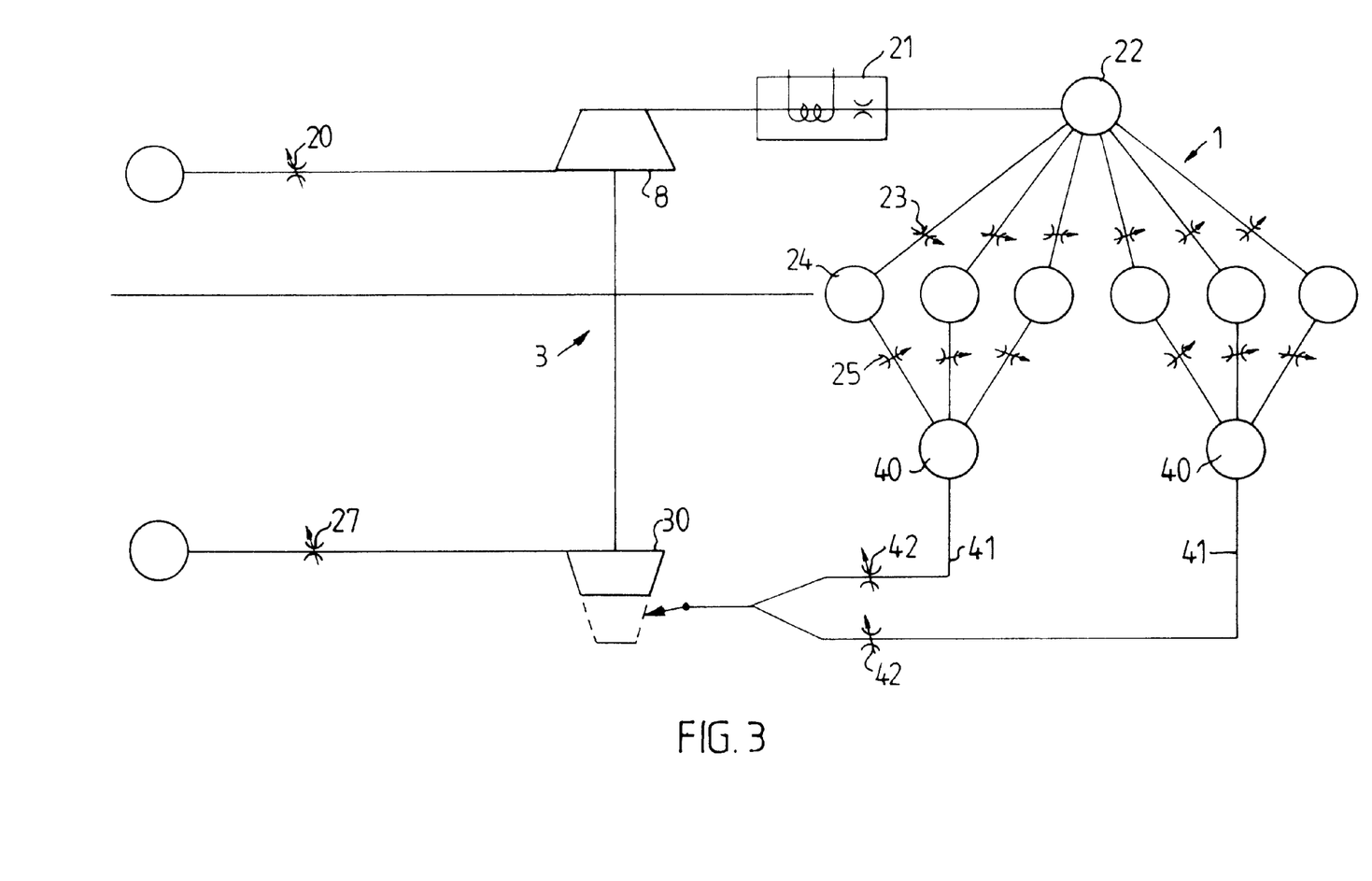
FIG. 3 a simplified schematic representation of a turbocharged engine with a turbine with variable geometry and with a device according to the invention.

FIG. 3 shows an engine installation differing from that described above by virtue of the fact that the turbocompound unit has been replaced by a turbocompressor unit with a turbine portion 30, which has continuously variable geometry. Details corresponding to those in FIG. 2 have been given the same reference numerals in FIG. 3 as in FIG. 2.

Figure 4:
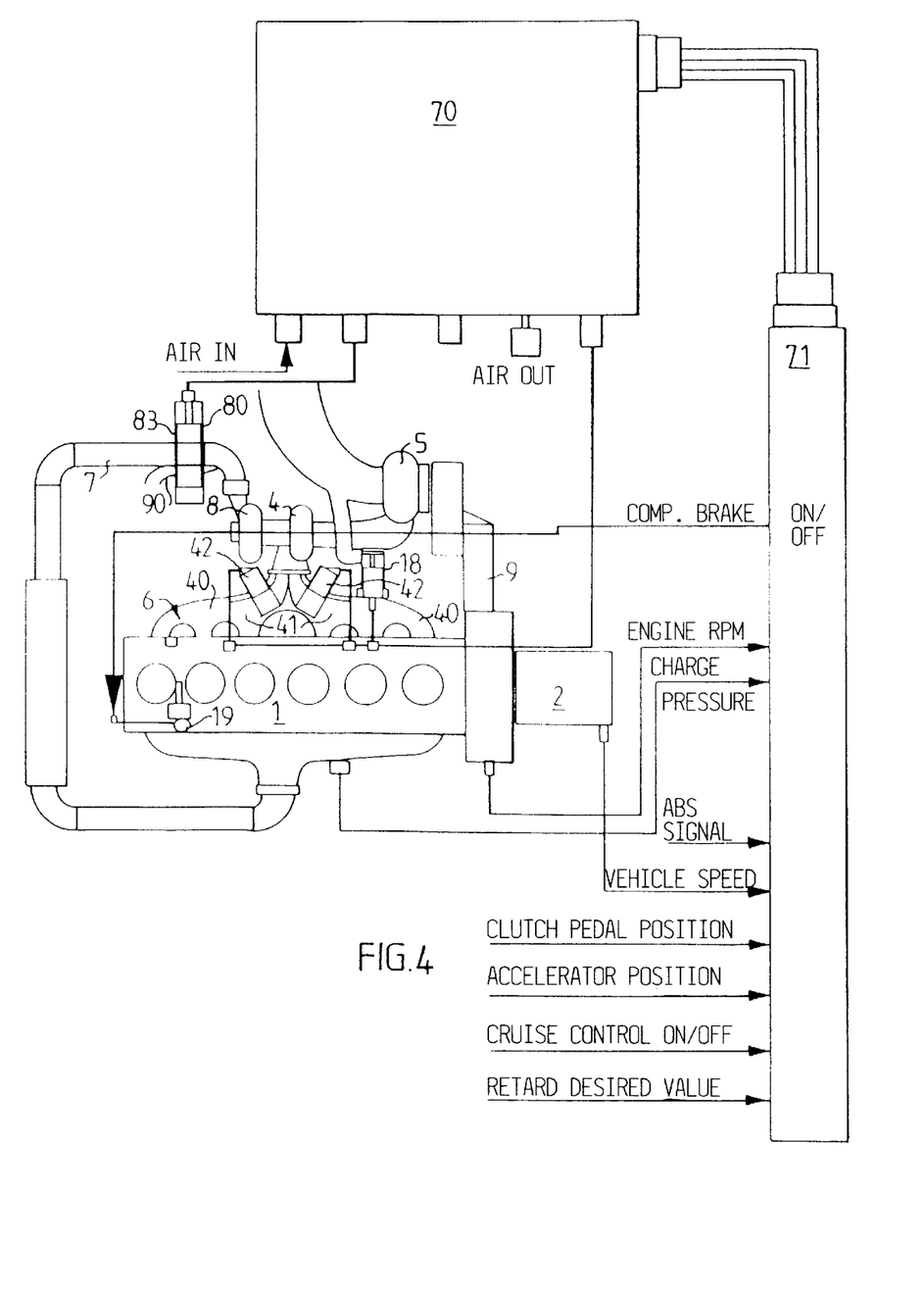
FIG. 4 a schematic representation of a turbocompound engine with a device according to the invention in a third embodiment, FIG. 5 a simplified schematic representation of the engine in FIG. 4, FIG. 6 a longitudinal section through an exhaust restrictor valve according to the invention.
Figure 5:
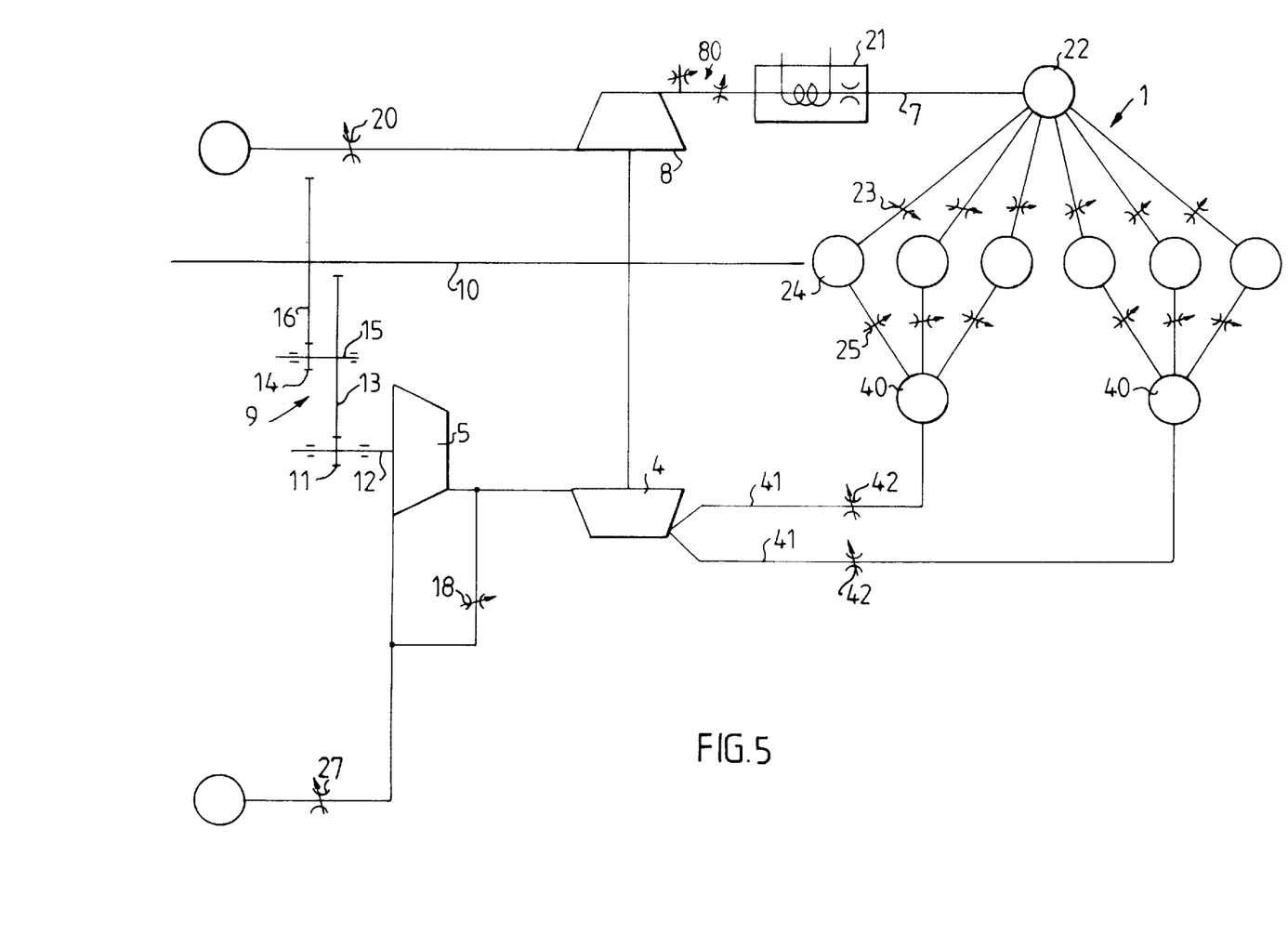
Figure 7:
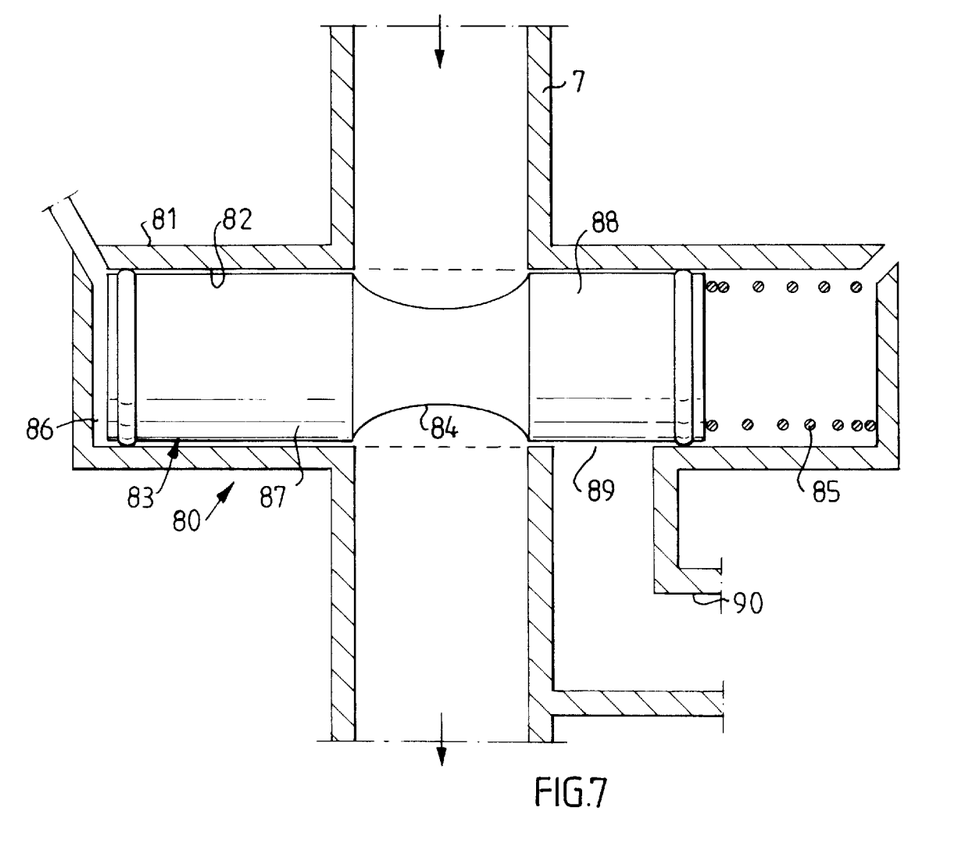
FIG. 7 a longitudinal section through a combined restrictor and venting valve on the intake side.

FIGS. 4 and 5 show an engine installation differing from that in FIGS. 1 and 2 by virtue of the fact that the waste-gate valve 17 on the exhaust side has been eliminated and been replaced by a combined restrictor and venting valve 80 in the induction conduit 7 on the pressure side of the compressor 8. The valve 80 is shown in more detail in FIG. 7. Parts corresponding to those in FIGS. 1 and 2 have been given the same reference numerals in FIGS. 4 and 5 as in FIGS. 1 and 2.

The valve 80 has a housing 81 made in one piece with the engine induction conduit 7 with a cylinder 82, in which a piston 83 is axially displaceable. The piston has a through-bore 84 and is biased by a spring 85 towards the open position shown in FIG. 7, in which air in the induction conduit can flow through the bore 84 to the engine cylinder. When the degree of charge of the compressor 8 is to be reduced, pressure medium is introduced to the cylinder chamber 86 to the left of the piston 83, and the piston is thus displaced to the right in FIG. 7 so that the piston portion 87 to the left of the bore 84 is displaced into the induction conduit 7 and reduces its flow-through area. At the same time, the piston portion 88 to the right of the bore 84 reveals the inlet 89 to the venting conduit 90 for releasing induction air from the induction conduit when the valve piston is in the restriction position. A valve 80 on the induction side operates in a cleaner environment than a waste-gate valve on the exhaust side and is also subjected to substantially lower thermal load than the latter. The valve 80 is of particularly simple construction by virtue of the fact that it only has a single moving part, i.e. the piston 83, which functions both as a restrictor in the induction conduit and as a valve element for the venting opening 89.

The manifold 6, as is most clearly illustrated in FIGS. 2 and 3, is divided into two submanifolds 40, the output exhaust conduits 41 of which meet in a confluence before the inlet to the turbocompressor unit 3 resp 30. In each exhaust conduit 41 a restrictor valve 42 is disposed in accordance with the invention, each valve having a completely open position and a restrictor position in which the flow-through area of the conduit 41 is reduced to create an exhaust counter-pressure in the exhaust manifold 6 during engine braking.

Figure 6:
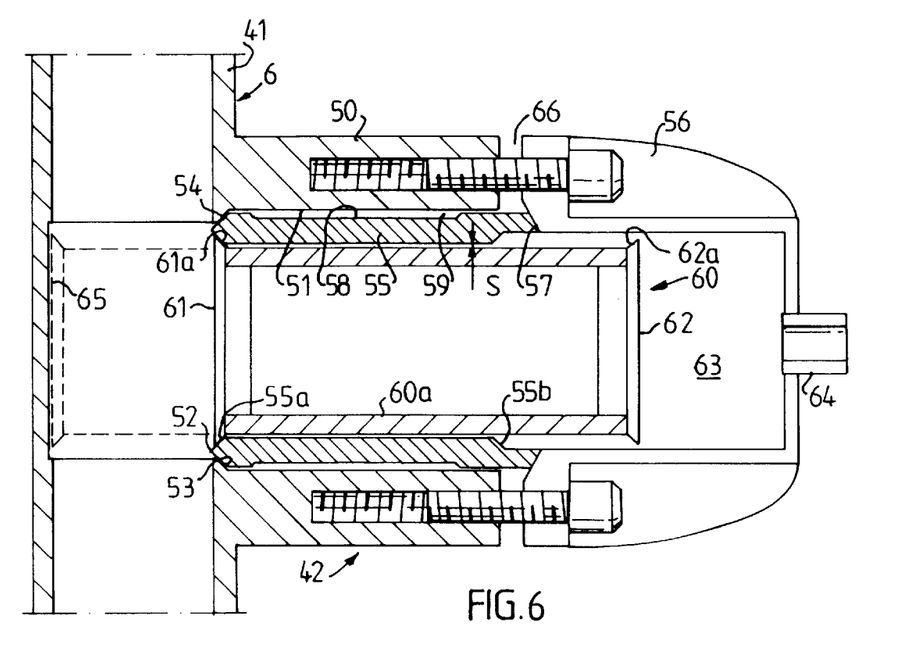

A valve 42, which is to function in the environment or an exhaust manifold, must be able to withstand high mechanical and thermal stresses. In the open position it must not present any flow obstacles or create turbulence in the exhaust conduit. A valve 42 which fulfills these conditions is shown in FIG. 6, where 50 designates a cylindrical valve housing, which is preferably cast in one piece with the exhaust manifold 6. The inner cylinder chamber 51 of the housing portion 50 opens into the interior of the exhaust conduit 41. The opening 52 itself is surrounded by a conical seat 53, against which there abuts a corresponding seat 54 at an end of a sleeve 55 of stainless steel. The sleeve 55 is kept in place by a cover 56 held securely in place on the housing portion 50 by means of screws. The cover 56 has a conical surface 57 which presses against a facing conical surface at the end of the sleeve 55. The sleeve 55 has a portion 58 of reduced diameter so that a cylindrical air gap 59 is formed, which communicates with the surrounding air via an annular gap 66 between the housing portion 50 and the cover 56.

Inside the sleeve 55 there is a valve element in the form of a hollow piston 60. As can be seen in FIG. 6, there is a small play "S" between the exterior lateral surface of the piston 60 and the interior lateral surface of the sleeve 55. The cylindrical portion of the piston 60 consists of a tube 60a of hard-chromium plated stainless steel. End plates 61, 62 are fixed to the ends of the tube 60a. These from valve discs with conical edge portions 61a, 62a and are preferably sintered. The sleeve 55 is provided at its distal end with a seat 55a, against which the edge portion 61a of the disc 61 is in sealing contact when the valve is in its open position (as is shown in FIG. 4). When compressed air with a pressure on the order of 8 bar is supplied to the cylinder chamber 63 via an inlet 64, the piston 60 is displaced to the left in FIG. 4 at the same time as leaking air into the gap "S" blows it free of any soot there. The piston 60 is displaced perpendicular to the exhaust conduit 41 and stops with its disc 61 at a small distance from a surface 65 of the opposite wall portion of the conduit 41, when the conical edge portion 62a of the disc 62 strikes an inner conical seat 55b of the sleeve 55, so that exhaust cannot leak into the cylinder chamber. As long as there is pressure in the cylinder chamber, the piston 60 is held in its restricting position. The diameter of the piston 60 and the cross-section of the conduit 41 are adapted to each other so that a restricted passage for exhaust is obtained between the inner wall of the conduit and the piston. When the piston 60 is to be returned to its starting position in FIG. 6, the cylinder chamber 63 is drained, and the exhaust pressure, which is propagated through the gap "S" and acting against the disc edge 62a, causes the piston to be displaced into the sleeve 55. No return spring is required and the only moving part of the valve is the piston 60, and this results in high operational reliability.

The compression braking device 19 is electrically operated while the valves 17, 18, 42 and 70 are operated by compressed air. They are controlled by a control valve unit 70 connected to a pressure source (not shown) and a control unit 71, which is preferably a microprocessor, which provides output signals for turning the compression braking device on and off and for adjusting the valves 17, 18 and 42 depending on a number of different engine and vehicle variables fed into the control unit from sensors which are known per se and are not shown in more detail here. As is indicated in FIG. 1. signals are fed into the control unit 71 representing induction air pressure (charge pressure) and engine rpm, i.e. engine data, and signals representing ABS on/off, vehicle speed, clutch pedal position, accelerator position, cruise control on/off and retardation level, i.e. vehicle data.

The device can function in the following manner:

The driver adjusts, with a hand control (not shown) the retardation to a certain level and activates the cruise control, so that a signal representing the selected retardation is fed into the control unit 71, which compares the set desired value of the retardation with the actual value of the retardation computed via the actual value of the speed. When the driver lets up on the accelerator, providing the clutch pedal is not depressed, the control unit 71 will set, via the control valve unit 70, the restrictor valves 42 in restrictor position, open the shunt valve 18 to bypass the second turbine stage 5 and, depending on the difference between the actual value and the desired value, adjust the waste-gate valve 17 to provide a suitable degree of charge in the first turbine stage 4, and activate the compression braking device 19. In the embodiment shown in FIG. 3, the degree of charge is instead provided by varying the turbine geometry in the turbine portion 30. If the selected level of retardation should be too high in view of the road surface, so that the drive wheels lose their grip, the ABS system reduces the engine braking power by sending a signal to turn off the compression brake 19 and then engage it again at a lower retardation level, or, alternatively, to provide the driver with the possibility of selecting a lower retardation level. Disengagement of the compression brake 19 also occurs if the driver should depress the clutch pedal, which is important to prevent killing the engine and thereby losing power steering and power brakes.

What is claimed is:

1. Apparatus for controlling the engine braking effect in an internal combustion engine in a motor vehicle, which is equipped with a compression braking device, the apparatus comprising:

means for varying the degree of charge in brake mode, which comprise: a) an exhaust-driven turbocompressor unit with a turbine portion and a compressor portion, and b) a restrictor valve disposed in an engine exhaust conduit upstream of the turbine portion of the turbocompressor unit;

means actuatable by a driver of the vehicle for activating the compression braking device and the means for varying the degree of charge; and a combined restrictor and venting valve unit arranged in an engine induction conduit on the pressure side of the compressor portion.

2. The apparatus according to claim 1, wherein the turbocompressor unit is coordinated with a first wastegate valve which can be set for various charge pressure levels.

3. The apparatus according to claim 2, wherein the turbocompressor unit comprises a first turbine stage, which drives the compressor portion and is coordinated with the first wastegate valve; and a second turbine stage which is coupled, via a transmission, to an engine crankshaft and is coordinated with a second wastegate valve, which in one position conducts exhaust past the second turbine stage.

4. The apparatus according to claim 1, wherein the turbocompressor unit has a turbine portion with variable geometry.

5. The apparatus according to claim 1, wherein the restrictive valve has a restrictor position and a completely opened position.

6. Apparatus for controlling the engine braking effect in an internal combustion engine in a motor vehicle, which is equipped with a compression braking device, the apparatus comprising:

means for varying the degree of charge in brake mode, which comprise: a) an exhaust-driven turbocompressor unit with a turbine portion and a compressor portion, and b) a restrictor valve disposed in an engine exhaust conduit upstream of the turbine portion of the turbocompressor unit;

means actuatable by a driver of the vehicle for activating the compression braking device and the means for varying the degree of charge;

said restrictor valve comprising at least one valve having a cylinder communicating with the engine exhaust conduit and arranged perpendicularly to said exhaust conduit, said cylinder receiving with radial play a valve element in the form of a piston displaceable into the exhaust conduit under the influence of a pressure medium, said piston having a distal end surface and a proximal end surface and a valve disc at each end surface; and wherein the valve disc at the proximal end surface, in an extended position of the piston, abuts against a proximal seat in the cylinder to form a restricted exhaust passage past the piston; and the valve disc at the distal end surface, in a retracted position of the piston, contacts a distal seat in the cylinder.

7. The apparatus according to claim 6, wherein the cylinder is a sleeve of stainless steel which is received with play in a cylindrical space in a valve housing cast in one piece with a manifold.

8. The apparatus according to claim 6, wherein the valve piston consists of a tube of hard chromium-plated stainless steel and a sintered valve disc with a conical edge surface fixed at either end of the tube.

9. The apparatus according to claim 6, for use in a six-cylinder engine with two exhaust manifolds for each three cylinders, wherein a restrictor valve is arranged in each manifold.

10. The apparatus according to claim 6, wherein the turbocompressor unit is coordinated with a first wastegate valve which can be set for various charge pressure levels.

11. The apparatus according to claim 10, wherein the turbocompressor unit comprises a first turbine stage, which drives the compressor portion and is coordinated with the first wastegate valve; and a second turbine stage which is coupled, via a transmission, to an engine crankshaft and is coordinated with a second wastegate valve, which in one position conducts exhaust past the second turbine stage.

12. The apparatus according to claim 6, wherein the turbocompressor unit has a turbine portion with variable geometry.

13. The apparatus according to claim 6, wherein a combined restrictor and venting valve unit is arranged in an engine induction conduit on the pressure side of the compress or portion.

* * * * *